Nov. 24, 1953

W. D. EGLY ET AL 2,660,471

PROPULSION MEANS FOR GARDEN HOSE

Filed Jan. 14, 1950

WILLIAM D. EGLY
COLUMBUS W. HARRIS
INVENTORS

BY
Altach + Knoblock

ATTORNEYS

INVENTORS
WILLIAM D. EGLY
COLUMBUS W. HARRIS.
BY Oltsch & Knoblock
ATTORNEYS

Nov. 24, 1953  W. D. EGLY ET AL  2,660,471
PROPULSION MEANS FOR GARDEN HOSE
Filed Jan. 14, 1950  3 Sheets-Sheet 3

WILLIAM D. EGLY
COLUMBUS W. HARRIS
INVENTORS

BY Oltsch & Knoblock
ATTORNEYS

Patented Nov. 24, 1953

2,660,471

UNITED STATES PATENT OFFICE 2,660,471

PROPULSION MEANS FOR GARDEN HOSE

William D. Egly, South Bend, and Columbus W. Harris, Elkhart, Ind.

Application January 14, 1950, Serial No. 138,682

13 Claims. (Cl. 299—49)

This invention relates to propulsion means for garden hose, and more particularly to a device by means of which a garden hose may be pulled so as to permit the watering of a substantial area of garden or lawn.

The primary object of the invention is to provide a device of this character which is operated by the flow of water under pressure to a discharge point through a flexible hose which is pulled toward the device at a steady pace.

A further object is to provide a device of this character having a water power motor operable to advance a hose gripping and pulling unit and capable of exerting a strong pulling action under conditions where the available water pressure is low.

A further object is to provide a device of this character having two water pressure responsive members connected by conduits and valves in a manner to reciprocate step by step and alternately, wherein one of the members serves as a means to drive a power transmitter engageable with a garden hose.

Other objects will be apparent from the following specification.

Figure 1:
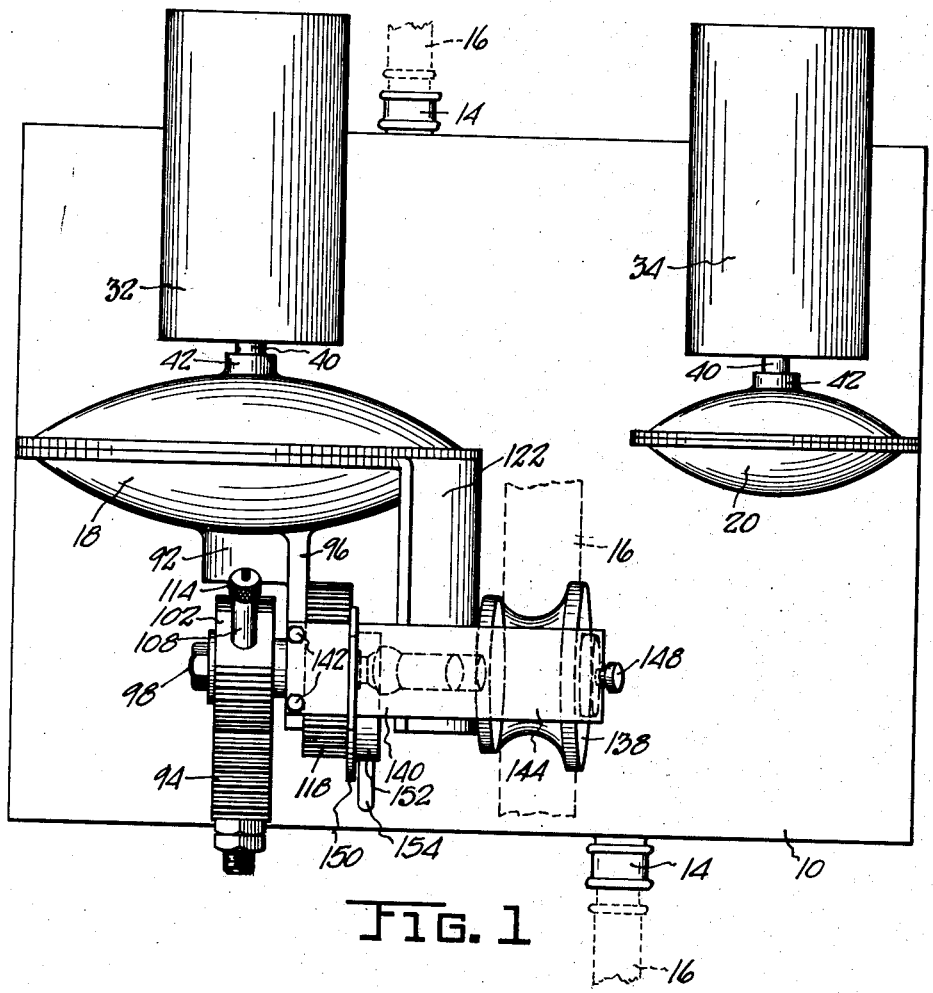
Fig. 1 is a top plan view of the device.

Referring to the drawings which illustrate the preferred embodiment of the invention, the numeral 10 designates a base or housing from which depends one or more impaling members or prongs 12 fixedly secured thereto and adapted to be pressed into the ground to anchor the device in selected position and location. The base may be of any form found suitable, and preferably has a plurality of passages extending therethrough for flow of water in predetermined direction. Couplings 14 are carried by the base 10 and communicate with said passages, said couplings serving as means by which lengths of flexible garden hose 16 may be detachably connected thereto for the purpose of supplying water thereto and discharging water therefrom. One of these lengths of hose 16 will be elongated and will constitute the discharge hose.

The base 10 mounts a pair of chambered members 18 and 20, each of which is provided with a standard 22 terminating in a base flange 24 secured to the base 10 by bolts 26. The standards 22 are preferably provided with passages which communicate with passages within the base 10 to establish communication between the water lines and the interiors of the casings. The chambered members 18 and 20 preferably have split housings which clamp therebetween the margins of flexible diaphragm members 28 and 30, respectively, which completely span said housings, dividing them into two opposite compartments, with each compartment of which one of said passages communicates. The diaphragm type of reciprocating pressure responsive member is illustrative and it will be understood that a double-acting piston (not shown) or other type of water reactance member may be used if desired.

A valve 32 is associated with the member 18, and a valve 34 is associated with the member 20. These valves preferably have cylindrical housing portions 36 of the character best seen in Fig. 5, and are mounted with their axes positioned parallel to the path of reciprocation of the motor units 18—20. The valve members are carried by the base 10 in fixed relation thereto by any suitable means, here illustrated as conduits 38, which serve to connect the ports of the valve with the liquid passages in the base 10.

Figure 5:
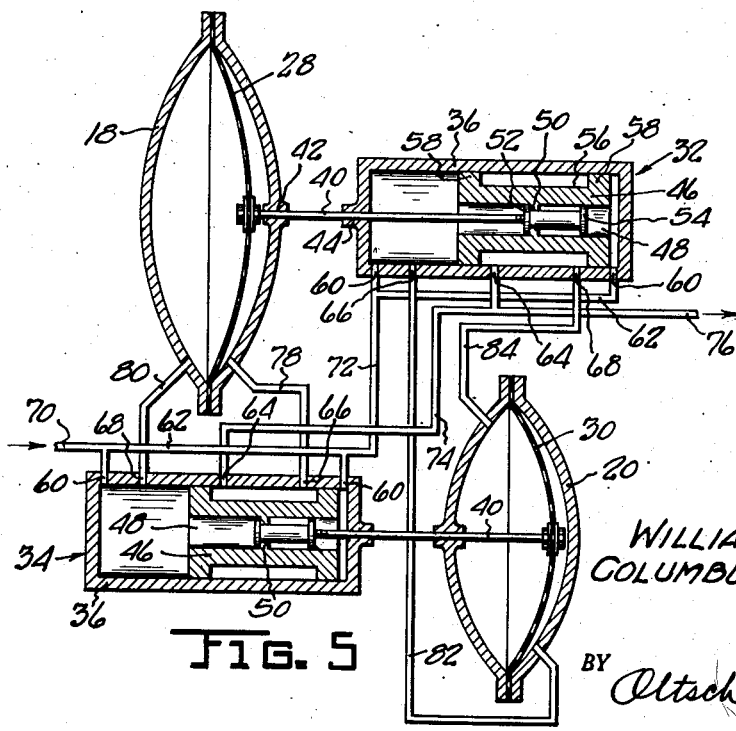
Fig. 5 is a schematic view illustrating the water pressure responsive members and the control valves in cross-section, and illustrating diagrammatically the connections between said parts.

Each of the diaphragms 28 and 30 has connected thereto at its center a stem or rod 40 which is slidable in the housing 18 at 42, as through a packing gland or the like (not shown). The rod 40 extends axially of the adjacent cylindrical valve housing 36, entering the same through one end with a slide fit at 44 which may constitute a packing gland. The valve element or spool 46 of each valve has an axial bore 48 into which the stem 40 projects. At its center the bore has a circumferential flange or rib 50 projecting inwardly and snugly and slidably receiving the stem 40. An inner head member 52 mounted upon the rod 40 is adapted to engage one end surface of the rib 50, as illustrated at valve 32 in Fig. 5. Spaced from the head 52 is a second head 54 also slidable freely within the bore 48 and adapted to bear against the opposite end surface of the circumferential rib 50, as illustrated in Fig. 5 at valve 34. The arrangement is such that the valve spools 46 are connected with the diaphragms 28 and 30, respectively, by lost motion connections.

Each valve spool has a circumferential externally grooved surface 56 preferably equispaced from its opposite ends, whereby circumferential flanges 58 are formed at the opposite ends of each valve spool.

The valve cylinder 36 is provided with five ports spaced longitudinally, the same being the end ports 60 which are connected in communication with each other by a passage 62, a central port 64 which is preferably positioned equispaced from the opposite ends of the valve housing, and intermediate ports 66 and 68 which are spaced from the central port 64 a distance slightly less than the width of the groove 56 of the spool and which are spaced from the adjacent end ports 60 a distance slightly greater than the width of the spool flange 58. The parts are so arranged that in the static positions of the spool valves, one of the end ports 60 will communicate with the adjacent one of the two intermediate ports 66, 68, while the other end port 60 is completely closed, and the center port 64 communicates with the other of the two intermediate ports 66, 68.

The passages in the base 10 which extend between the couplings 14, together with the conduits 38 or passages which lead to the valves 32 and 34, are illustrated diagrammatically in Fig. 5. The intake conduit 70 is shown as connected with the conduit 62 leading to the ports 60 of the valve 34 and being also serially connected through the conduit 72 with the similar ports and passages 60, 62 associated with the valve 32. A conduit 74 connects the center passages 64 of the two valves and continues to an outlet at 76. The intermediate port 66 of the valve 34 is connected by a passage 78 with the housing 18 at one side of the diaphragm 28 thereof, and a passage 80 connects the intermediate port 68 of the valve 34 with the housing 18 at the side of the diaphragm 28 opposite that with which the passage 78 communicates. A passage 82 establishes communication between the port 66 of the valve 32 and the chamber of member 20 at one side of the diaphragm 30, while the chamber at the other side of said diaphragm 30 is placed in communication with the port 68 of valve 32 by means of a conduit 84.

The parts are so arranged that, as illustrated in Figs. 5, 6, 7 and 8, an alternate successive operation of the two members 18 and 20 occurs.

Assuming that the parts of the device are in the position illustrated in Fig. 5, it will be apparent that water from the intake 70 passes into the valve 34 through the port 60 and discharges therefrom through the port 68 and the passage 80 into the member 18 at the left hand side of the diaphragm 28. While this action occurs, water which is trapped within the device at the right-hand side of the diaphragm 28 is discharged through passage 78, port 66, and out through the center port 64 which is in communication with the port 66 through the groove 56 of the valve spool. The water exhausted from port 64 travels through passage 74 to the outlet 76. It will be observed that the port 60 at the right-hand end of the valve 34 is closed at this time. The water entering at the inlet 70 also passes through conduit or passage 72 to the left-hand port 60 of the valve 32 which is in communication with the adjacent port 66 and conduit 82 to discharge water into chamber 20 at the right-hand side of the diaphragm 30. The water which is displaced from the chamber 20 at the left of the diaphragm 30 is discharged through the conduit or passage 84, port 68, passes through the valve spool groove 56, and is discharged through port 64 to the discharge outlet 76. Note in each of these instances that one of the heads 52, 54 bears against the center rib of the spool and prevents the flow of water through the bore 48 of the spool.

Figures 6, 7:
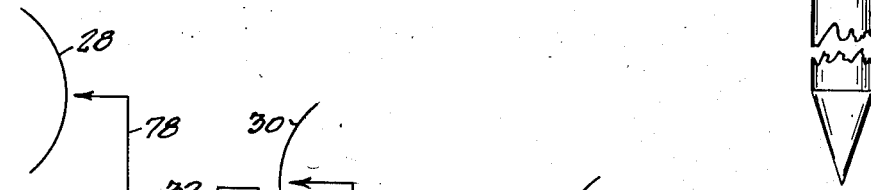
Figs. 6, 7 and 8 are schematic drawings illustrating the positions of the water reactance members and valve members at different stages in a complete cycle of operation.

As the flow of water continues while the parts are in the position illustrated in Fig. 5, the diaphragm 30 of the member 20 will be shifted toward the left until it assumes the position illustrated diagrammatically in Fig. 6. In this connection the initial movement of the diaphragm 30 will not act upon the spool 46 of the valve 34 because of the lost motion connection. This lost motion connection is determined by the spacing between the heads 52 and 54. It will be apparent, however, that when the head 52 contacts the rib 50 of the spool, which will occur at an intermediate point in the stroke of the diaphragm 30, the spool will be moved with the diaphragm 30 to a position wherein the central port 64 is placed in communication with the left intermediate port 68 and the right intermediate port 66 is placed in communication with the right-hand end port 60. When this action occurs, the flow of water to the member 18 will be reversed, the port 66 and passage 78 becoming the intake to the member 18, and the passage 80 and port 68 discharging to the port 64 and becoming the outlet from the member 18.

The reversal in flow causes the diaphragm 28 of the member 18 to move to the left, which movement initially is characterized by lost motion with respect to the spool 46 of the valve 32. When that lost motion is taken up or concluded, the movement of the diaphragm 28 of the member 18 will be effective to move the valve element 46 to the left-hand end of its path of travel in the valve 32 so that the parts will be positioned as illustrated diagrammatically in Fig. 7. In other words, the spool 46 of the valve 32 will then have established communication between the right-hand port 60 and the port 68 for intake and through the port 60 and the center port 64 for exhaust. Consequently, the intake of water to the member 20 at that stage will be through the port 68 and passage 84, and the exhaust will be through the passage 82 and the ports 66 and 64, which will cause actuation of the diaphragm 30 from the position illustrated in Fig. 7 to the position illustrated in Fig. 8, which corresponds with the full line position illustrated in Fig. 5.

Figure 8:
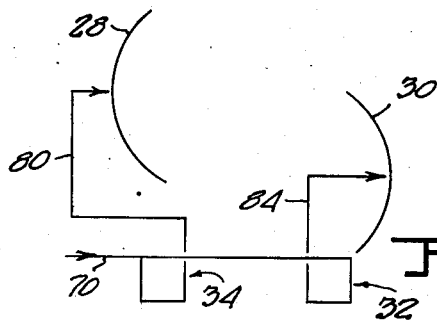

The assumption by the parts of the position illustrated in Fig. 8, wherein the valve 34 is positioned as illustrated in Fig. 5, again changes the control of flow to the member 18 to cause movement thereof toward the right as viewed in Fig. 5. Thus the operation of the parts successively to the positions shown in Figs. 5, 6, 7 and 8, and back to the position illustrated in Fig. 5, constitutes one full cycle of the operation of the motor mechanism of the device. These operations continue under the inherent control provided by the system as long as a flow of water through the device continues.

Figure 2:
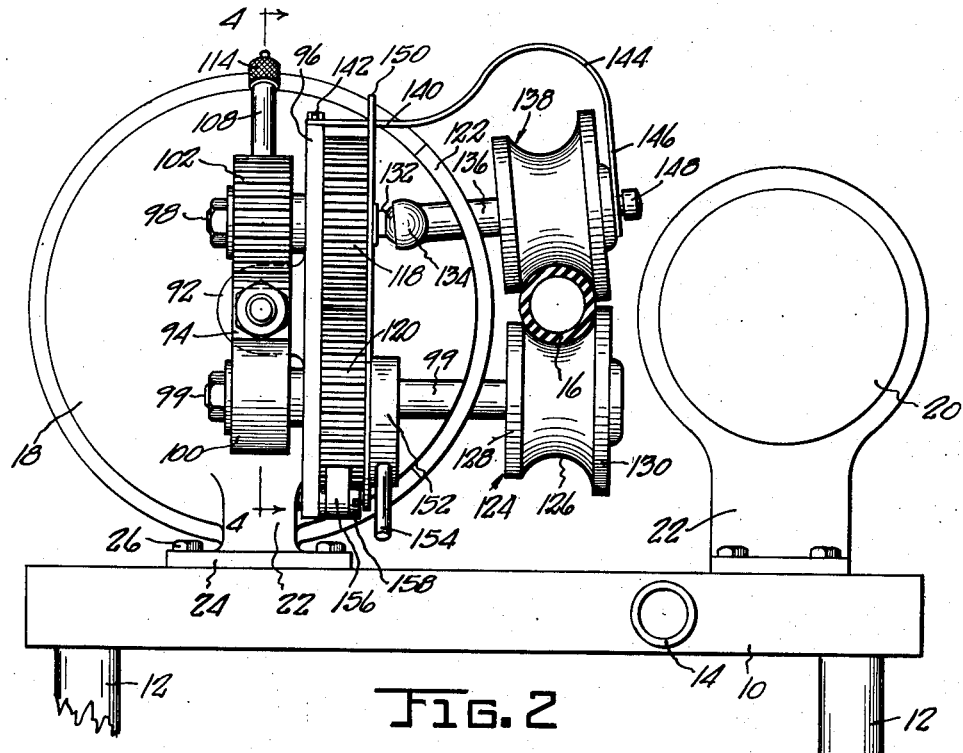
Fig. 2 is an end view of the device.
Figure 3:
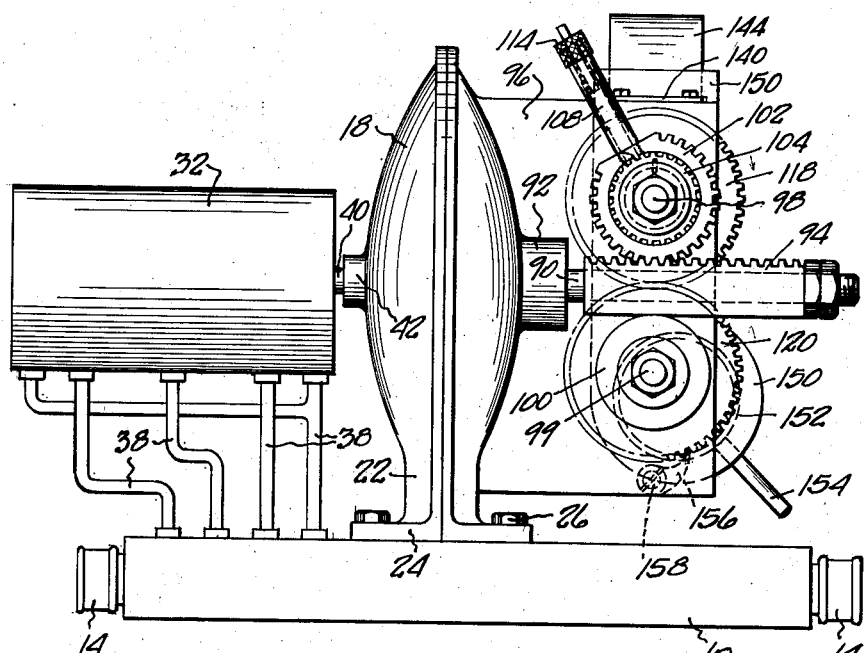
Fig. 3 is a side view of the device.

One of the members 18, 20, here shown in Figs. 1, 2 and 3 as the member 18, has a rod or shaft 90 projecting therefrom at the side opposite that from which the rod 40 projects, said rod 90 preferably being a substantial continuation of the rod 40. A packing gland or other suitable seal 92 provides for sealed sliding movement of the shaft 90 relative to the housing 18. Upon its outer end the shaft 90 mounts an elongated gear rack 94, best seen in Fig. 3.

Figure 4:
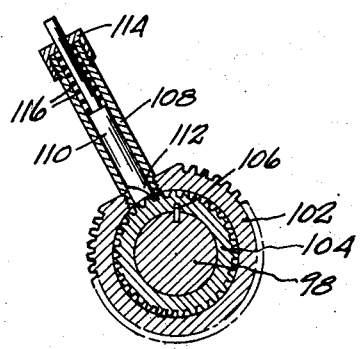
Fig. 4 is a fragmentary sectional view of the device taken on line 4—4 of Fig. 2.

The frame of the member 18 preferably includes a bracket or plate portion 96, although it will be understood that a suitable bracket or plate may be secured to the base 10 instead of to the member 18. A pair of shafts 98 and 99, extending in parallel relation to each other and transversely to the rack 94 and the bracket 96, are journaled in suitable bearings carried by the bracket 96. The lower shaft 99 preferably mounts a roller or disc 100 which bears against the flat bottom surface of the gear rack 94. The upper shaft 98 mounts a multilated pinion 102 which meshes with the gear 94. The pinion 102 has a one-way clutch associated therewith, as illustrated in Fig. 4, which serves to transmit to the shaft 98 the movement of the rack 94 in one direction, but to have lost motion with reference to said shaft in the opposite direction of movement. The pinion 102 has a central bore therein within which is rotatably received a pinion 104 which is mounted on the adjacent shaft 98 and splined thereto at 106. A radial opening at the mutilated portion of the pinion 102 receives by screw-threaded connection the inner end of an elongated tube 108 which opens at the bore within which the pinion 104 is mounted. The tube 108 slidably receives a plunger 110 having a tapered end portion 112 so constructed and arranged that the rotation of the member 102 to the left will cause the plunger to slide over the successive gear teeth of the pinion 104 while reverse rotation will effect a driving connection between the parts. The plunger 110 preferably includes a reduced dimension stem portion 112 which projects from the end of the sleeve 110 through an aperture in a cap 114 secured upon said sleeve or tube and forming an abutment for the outer end of a coil spring 116 which encircles the stem 112 and bears at its inner end against the shoulder between the plunger 110 and its stem 112.

The shafts 98 and 99 have pinions 118 and 120, respectively, mounted thereon, which pinions mesh with one another. A second bracket 122 spaced from the bracket 96 is carried by the member 18, as illustrated, and the shaft 99 extends therethrough, as best seen in Fig. 2, and mounts upon its outer end a roller 124. This roller is preferably formed of soft rubber of a consistency and character adapted to have a substantially non-sliding gripping action upon a garden hose when pressed thereagainst. The roller 124 has a central circumferential groove 126 of arcuate cross-sectional configuration, and, as illustrated, has at its inner end a flange 128 of slightly smaller diameter than the flange 130 at its outer end. The roller 124 has a non-rotating fit upon the shaft 99.

The shaft 98 which mounts the pinion 102 and the gear 118 preferably terminates in a knuckle portion 132 which cooperates with a socket part 134 to form a universal joint. The socket 134 is mounted upon a stub shaft 136 which passes through an elongated slot in the bracket 122 to accommodate movement toward and from the shaft 99 and the roller 124. A roller 138 preferably of the same character and construction as the roller 124 is mounted upon the outer end of the stub shaft 136 in such position that the grooves of said rollers are adapted to receive and position therethrough a length of flexible garden hose.

In order to apply spring pressure upon the shaft 136 and the roller 138 tending to press the roller 138 toward the roller 124 to effect a frictional grip upon the hose 16, an elongated leaf spring is utilized. The leaf spring has an end portion 140 which is fixedly mounted at 142 upon the bracket 96 and projects substantially parallel to the shaft 98. The spring portion 140 merges with a gooseneck bend 144 which extends around the roller 138 with clearance, said spring terminating in an end portion 146 positioned radially with respect to the flange 138 and anchored to the outer end of the stub shaft 136 at 148 in a manner to accommodate free rotation of the shaft 136 relative to said spring.

A plate 150 is positioned substantially parallel to the plate 96 but spaced therefrom and having enlarged apertures (not shown) passing freely around the shafts 98 and 99. A cam 152 is mounted rotatably upon the shaft 99 and is received in an opening in the plate 150 and serves to move the plate 150 bodily. The plate has an aperture through which the spring 140 extends so that endwise movement of the plate 150 by the cam 152 serves to flex the spring 140 in a manner to apply pressure to the roller 132, causing a gripping action of the hose 16 between the rollers 124 and 138. A handle 154 preferably projects from the cam to facilitate the rotation of the cam, it being understood that the cam action is such that in one rotative position thereof it will be thrown over center and caused to lock the parts in the spring tension applying position, while in the other over center position it will hold the parts to space the roller 138 from the roller 124 sufficiently to facilitate the insertion of hose 16 between the rollers or the removal of the hose from said rollers.

A pawl or detent 156 is pivoted to the bracket 96 at 158 and is spring pressed against the gear 120. The parts are so arranged and cooperate with the one-way clutch illustrated in Fig. 4 that the gears will be held stationary while the one-way clutch illustrated in Fig. 4 is in its lost motion setting.

It will be understood that the construction here illustrated is illustrative only of one type of drive and that a double-acting drive, instead of the single acting drive here illustrated, can be provided by mounting upon the shaft 99, in place of the roller 100, a second one-way drive pinion mechanism of the type illustrated in Fig. 4, and by providing gear teeth upon the bottom of the rack 94 to mesh with said second one-way drive pinion. In other words, whereas the construction illustrated has a single action drive operative only while the rack 94 is traveling in one direction of its reciprocating movement, a two-way drive may be provided for transmitting driving rotation to the rollers 124 and 138 on both strokes of the rack.

It will be apparent that the hose from which the water is discharged and which is connected at the coupling 14 with the discharge outlet 76, is passed between the rollers 124, 138, as illustrated in Fig. 2, and that its free end portion is then positioned in the garden or upon the lawn to be watered. Any suitable sprinkler or water distributor may be mounted upon the free end of the hose. The device itself is firmly fixed in selected position by pressing the impaling pins 12 into the ground, and a length of hose is utilized to connect the coupling 14 associated with the intake 70 with a supply of water under pressure, such as with a faucet or a valve connected either with a city water main or with a pump. Whenever the water flows, it causes the device to operate in a manner to rotate the rollers 124, 138 and thereby pull upon the hose gripped therebetween. This pulls the water distributor toward the device at a slow rate of speed and causes the strip of garden or lawn, along which the discharge hose originally is laid, to be progressively watered. In other words, the water which is being distributed serves as the means to drive or power the machine as it flows from its source to the discharge point at the free end of the trailing hose which is being pulled upon by the device.

One of the primary values and important points of this device is that the device operates satisfactorily regardless of variations of pressure. The city water services in different communities operate at different pressures and also are subject at different seasons of the year to fluctuations in operating pressures varying with the rate of demand for water. Also the output of different pumps in farm water systems varies from place to place. This device will operate satisfactorily in all such locations regardless of such variations in rate of flow.

While the preferred embodiment of the invention has been illustrated and described herein, it will be understood that changes in the construction may be made within the scope of the appended claims without departing from the spirit of the invention.

We claim:

1. A propulsion device for garden hose comprising a base, ground impaling members carried by said base, a water reactance device, drive mechanism actuated by said water reactance device and including a pair of juxtaposed friction rollers both of which are driven by the water reactance device and adapted to grip a garden hose therebetween.

2. A propulsion device for garden hose comprising a base, ground impaling members carried by said base, a water reactance device, drive mechanism actuated by said water reactance device and including a pair of rotatable friction rollers adapted to grip and advance a garden hose, said water reactance device including a pair of chambered members each mounting a diaphragm, and water flow network including a pair of valve members each actuated by the diaphragm of one chambered member and serving to control the flow of water to and from the other chambered member.

3. A propulsion device for garden hose comprising a base, ground impaling members carried by said base, a water reactance device, drive mechanism actuated by said water reactance device and including a pair of rotatable friction rollers adapted to grip and advance a garden hose, said water reactance device including a reciprocating member, said drive mechanism including a rack carried by said reciprocating member and a pinion meshing with said rack, and a one-way clutch interposed in the drive connection between said pinion and said friction rollers.

4. A propulsion device for garden hose comprising a base, ground impaling members carried by said base, a water reactance device, drive mechanism actuated by said water reactance device and including a pair of rotatable friction rollers adapted to grip and advance a garden hose, said drive connection including a universal joint associated with one roller and a spring normally urging said roller toward the other roller.

5. A propulsion device for garden hose comprising a base, ground impaling members carried by said base, a water reactance device, drive mechanism actuated by said water reactance device and including a pair of rotatable friction rollers adapted to grip and advance a garden hose, one of said rollers being shiftable toward and away from the other roller, a spring normally urging said shiftable roller toward the other roller, and cam actuated means for biasing said spring in either of two opposed directions.

6. In combination, a base, a pair of water pressure motors carried by said base, a pair of flow control valves carried by said base and each actuated by a motor, a network of liquid passages formed in part in said base and communicating with said motors and valves, each valve controlling flow in said network to and from the motor actuating the other valve, whereby said motors operate alternately, each motor operating in opposite directions upon successive actuations thereof, and drive mechanism responsive to one motor and including a pair of rollers for gripping a garden hose and rotatable for advancing said hose.

7. Propulsion means for a flexible water conduit, comprising a base, a pair of water pressure motors carried by said base, a pair of flow control valves carried by said base and each actuated by a motor, a network of liquid passages formed in part in said base and communicating with said motors and valves, each valve controlling flow in said network to and from the motor actuating the other valve, whereby said motors operate alternately, each motor operating in opposite directions upon successive actuations thereof, and a pair of juxtaposed friction rollers rotated by one motor for gripping therebetween and advancing a flexible water conduit, and water conduits connected at the intake and outlet portions of said network, the conduit connected at said outlet being flexible to extend to and be gripped by said drive mechanism.

8. Propulsion means for a flexible water conduit, comprising a base, a pair of water pressure motors carried by said base, a pair of flow control valves carried by said base and each actuated by a motor, a network of liquid passages formed in part in said base and communicating with said motors and valves, each valve controlling flow in said network to and from the motor actuating the other valve, whereby said motors operate alternately, each motor operating in opposite directions upon successive actuations thereof, drive mechanism responsive to one motor and including a pair of juxtaposed driven rollers for gripping therebetween and advancing a flexible conduit, and an anchor member fixedly secured to and depending from said base.

9. Propulsion means for a flexible water conduit, comprising, a base having a plurality of interconnecting passages therein and an intake and an outlet, a pair of diaphragm motors each having a pair of said passages communicating therewith, a pair of flow control valves each having a plurality of said passages communicating therewith, each valve being actuated by one of said motors and serving to control the direction of flow of water to and from the other motor, and juxtaposed friction rollers rotated by at least one motor for gripping therebetween and advancing a flexible water conduit.

10. Propulsion means for a flexible water conduit, comprising, a base having a plurality of intercommunicating passages therein and an intake and an outlet, a flexible water conduit connected to said outlet, a pair of diaphragm motors each having a pair of said passages communicating therewith, a pair of flow control valves each having a plurality of said passages communicating therewith, each valve being actuated by one of said motors and serving to control the direction of flow of water to and from the other motor, a pair of juxtaposed friction rollers driven by at least one motor for gripping therebetween and advancing said flexible outlet conduit, and ground anchor means carried by said base.

11. Propulsion means for a flexible water conduit, comprising, a base having a plurality of intercommunicating passages therein and an intake and an outlet, a pair of diaphragm motors each having a pair of said passages communicating therewith, a pair of flow control valves each having a plurality of said passages communicating therewith, each valve being actuated by one of said motors and serving to control the direction of flow of water to and from the other motor, and juxtaposed rollers rotated by at least one motor for gripping therebetween and advancing a flexible water conduit, said flow control valves each constituting an elongated housing fixed relative to said base and having a plurality of longitudinally spaced ports and slidably receiving a valve element connected with the actuating motor thereof to control the flow of liquid to and from said ports and passages.

12. Propulsion means for a flexible water conduit, comprising, a base having a plurality of intercommunicating passages therein and an intake and an outlet, a flexible water conduit connected to said outlet, a pair of diaphragm motors each having a pair of said passages communicating therewith, a pair of flow control valves each having a plurality of said passages communicating therewith, each valve being actuated by one of said motors and serving to control the direction of flow of water to and from the other motor, and juxtaposed rollers rotated by at least one motor for gripping and advancing a hose, said flow control valves each constituting an elongated housing mounted fixedly on said base and having multiple longitudinally spaced ports and a spool slidable in said housing by the actuating motor thereof to control liquid flow between said ports and passages, each spool having a lost motion connection with the motor which actuates it.

13. A propulsion device for garden hose as defined in claim 1, and means resiliently urging one roller toward the other.

WILLIAM D. EGLY.
COLUMBUS W. HARRIS.

References Cited in the file of this patent
UNITED STATES PATENTS

| Number | Name | Date |
|---|---|---|
| 109,338 | Myers | Nov. 15, 1870 |
| 255,854 | Hall | Apr. 4, 1882 |
| 2,061,898 | De Motte | Nov. 24, 1936 |
| 2,157,367 | Werner | May 9, 1939 |
| 2,264,518 | Foster | Dec. 2, 1941 |
| 2,518,990 | Keener | Aug. 15, 1950 |